(12) United States Patent
Tuulos et al.

(10) Patent No.: US 7,933,211 B2
(45) Date of Patent: Apr. 26, 2011

(54) METHOD AND SYSTEM FOR PROVIDING PRIORITIZED FAILURE ANNOUNCEMENTS

(75) Inventors: Martti Tuulos, Tampere (FI);
Jani-Pekka Virtanen, Valkeakoski (FI);
Lauri Kahari, Tampere (FI); Pirkko Laaksonen, Tampere (FI); Colum Gaynor, Lohja Asema (FI); Eero Wallenius, Kangasala (FI)

(73) Assignee: Nokia Corporation, Espoo (FI)

( * ) Notice: Subject to any disclaimer, the term of this patent is extended or adjusted under 35 U.S.C. 154(b) by 599 days.

(21) Appl. No.: 11/737,287

(22) Filed: Apr. 19, 2007

(65) Prior Publication Data
US 2008/0144488 A1   Jun. 19, 2008

(51) Int. Cl.
*H04L 12/26* (2006.01)

(52) U.S. Cl. ....................... 370/242; 370/216

(58) Field of Classification Search .......... 370/216, 370/241, 242, 247, 252, 395.42
See application file for complete search history.

(56) References Cited

U.S. PATENT DOCUMENTS

| | | | |
|---|---|---|---|
| 4,600,962 A * | 7/1986 | Bliehall | 361/77 |
| 6,628,516 B2 * | 9/2003 | Boe | 361/679.33 |
| 6,820,213 B1 * | 11/2004 | Somers et al. | 714/11 |
| 2006/0072707 A1 * | 4/2006 | Araujo et al. | 379/1.01 |
| 2008/0074247 A1 * | 3/2008 | Plantamura | 340/438 |

* cited by examiner

*Primary Examiner* — Brenda Pham
(74) *Attorney, Agent, or Firm* — Ditthavong Mori & Steiner, P.C.

(57) ABSTRACT

An approach is provided for announcing a fault condition or failure in a network system. Announcement notifications are prioritized based on a priority information derived from at least two local parameters determined at a respective network element (NE1 to NEn). Thereby, fault correction activities can be optimized.

22 Claims, 3 Drawing Sheets

METHOD AND SYSTEM FOR PROVIDING PRIORITIZED FAILURE ANNOUNCEMENTS

FIELD OF THE INVENTION

The invention, according to various embodiments, relates to communications, and particularly, to fault detection.

BACKGROUND OF THE INVENTION

In network systems, announcements (e.g., alarms) about abnormal functioning of the system or about failure are typically transmitted or signaled to the network management system. Network systems, like communication networks, typically comprise a plurality of network elements and further the network elements comprise a plurality of physical and logical devices/resources/functions. These are called "managed objects" in the context of network management. The network management system may comprise one or more network management devices.

As an example, the International Telecommunication Union (ITU) has developed a standard X.733 about an alarm reporting function which provides a user, e.g., an operator, with the ability to transmit and clear alarms. Alarms are events that indicate changes in networking or system environment, which is of concern to the network management.

Based on the above standard X.733, the Third Generation Partnership Project (3GPP) has developed a set of technical specifications (TS32.111-x) for fault management (FM) in 3G systems. In addition to detecting failures in the network system, and reporting them, the fault management includes associated features in an operations system (OS), such as the administration of alarm list, the presentation of operational state information of physical and logical devices/resources/functions, and the provision and analysis of the alarm and state history of the network. TS 32.111-2 V6.8.0 defines an Alarm Integration Reference Point (IRP) Information Service (IS), which addresses the alarm surveillance aspects of FM. The purpose of the Alarm IRP is to define an interface through which a "system" (typically a network element manager or a network element) can communicate alarm information relating to its managed objects to one or several manager systems (typically network management systems). The Alarm IRP IS defines the semantics of alarms and the interactions visible across the reference point in a protocol neutral way, and the semantics of the operations and notifications visible in the IRP.

A wide communication network such as a nation wide mobile access network can create a huge number of alarms from its thousands of network elements comprising numerous network element computer units and logical resource instances (managed objects). Alarms are created for example by autonomous self-check circuits and procedures within the network element, or by an element/network manager, and reported to the network management system by sending alarm notifications. A root cause for a fault state can be for example a software problem, a hardware failure, an erroneous operator action or sometimes even a radical change in the environment, like rain or fog hindering signal transmission to a receiver, excessive temperature causing processor errors, external RF noise hindering signal receipt at a receiver, humidity causing electrical leakages, etc.

The network management device(s) of a network management system typically provide tools for monitoring (visualizing) alarms which are received from the network. FIG. 6 illustrates an example of such an alarm monitoring tool. For a network operator, managing the network, it is difficult to prioritize corrective actions for failures due to huge amount of alarms (which can be thousands per day) as well as the amount of network entity instances to which the alarms relate to. Alarms may indicate same relative fault severity (e.g., critical, major, minor), although they are detected in network entity instances which are not equally critical from a network operation point of view. Also the importance of the network entity instance may vary for example daily or hourly (e.g., during busy hours).

The network may report also its performance to the network management system. Typically measurement reports are received in network management system periodically, for example once per quarter/hour/day, i.e., in a non-real time manner. Reports contain a large amount of indicators which give information of the performance of the network, network element and its resources. The amount of measurement data received daily in the network management system can be huge (that is hundreds of Mega/Gigabytes per day).

An operator's network management system may comprise a post-processing tool for analyzing the alarms and their correlations to each other, and thus trying to find out the root cause of the failures. Possibly the post-processing analysis take into account network performance data and other parameters also, like network structure. The post-processing analysis may help operator to prioritize corrective actions (e.g., in which order the faults in NEs should be corrected), but the analysis takes time and requires a lot of processing capacity because of the huge amount of received (and stored) data in the network management system. Also the result of such analysis cannot be in real-time, because significant part of the data in the network management system is received in non-real time.

SUMMARY OF THE INVENTION

Therefore, there is a need to provide an improved announcement method and system, by means of which operator activities in fault correction can be optimized.

According to an embodiment of the invention, a method comprises:
  defining at least two priority indicators for a fault correction;
  determining at a network element of a network system a fault correction priority based on said at least two priority indicators, in response to a detection of said fault condition or failure at said network element; and
  transmitting an announcement notification to a network management function, said announcement notification indicating said detected fault condition or failure and comprising an information about said determined fault correction priority.

According to another embodiment of the invention, a system comprises:
  determination means for determining at a network element a fault correction priority based on at least two priority indicators, in response to a detection of said fault condition or failure at said network element; and
  transmitting means for transmitting an announcement notification to a network management function, said announcement notification indicating said detected fault condition or failure and comprising an information about said determined fault correction priority; and
  prioritizing means for prioritizing management actions of said network management function based on said information about said determined fault correction priority.

According to another embodiment of the invention, a network element comprises:

determination means for determining a fault correction priority based on at least two priority indicators, in response to a detection of said fault condition or failure at said network element;

adding means for adding an information about said determined fault correction priority to an announcement notification; and transmitting means for transmitting said announcement notification to a network management function.

According to another embodiment of the invention, a network management device comprises:

correlating means for correlating announcement notifications received at said management function device based on an information indicating a determined fault correction priority and added to each of said received announcement notifications; and prioritizing means for prioritizing management actions based on said information about said determined fault correction priority.

The functionalities of the invention, according to certain embodiments, can be implemented as a computer program product comprising code means for generating the detecting and adding steps of the above first method according to the first aspect or detecting, combining and adding steps of the above second method according to the second aspect when run on a computer device.

Accordingly, more information is integrated into a single announcement (e.g., alarm) when a fault or failure is detected. By determining and adding the fault correction priority already at the source network element, operator and/or management activities can be optimized. This serves to focus operator's efforts on exactly right actions instead of wasting time for scanning huge amounts of alarms which are not exactly telling the root cause. The need for transmitting data (which affects action prioritization) to the network management function and then post-processing that data is avoided, so that resulting delays caused by such post-processing can be eliminated or at least decreased.

The at least two priority indicators may be selected from a perceived severity of the detected fault condition or failure, a criticality of said network element, a performance of the network element, and at least one predetermined environmental condition. The severity may be determined in accordance with a predetermined standard In an exemplary embodiment, the at least one predetermined environmental condition may be derived from a detection of at least one of a temperature, humidity, radio frequency noise level, or water level. The criticality of the network element may be determined in dependence on at least one of location, role and compensation option of the network element. The performance of the network element may be determined by comparing traffic load or other relevant occasion prior to and during the detected fault condition or failure.

According to one embodiment, the announcement notification may be an alarm notification, e.g., as specified in ITU-T X.733.

Further embodiments are defined in the dependent claims.

BRIEF DESCRIPTION OF THE DRAWINGS

In the following, the invention, according to certain embodiments, will be described with reference to the accompanying drawings, in which.

DESCRIPTION OF PREFERRED EMBODIMENTS

Exemplary embodiments will now be described based on an alarm reporting functionality as defined in the ITU X.733 and 3GPP TS 32.111 specifications.

Figure 1:
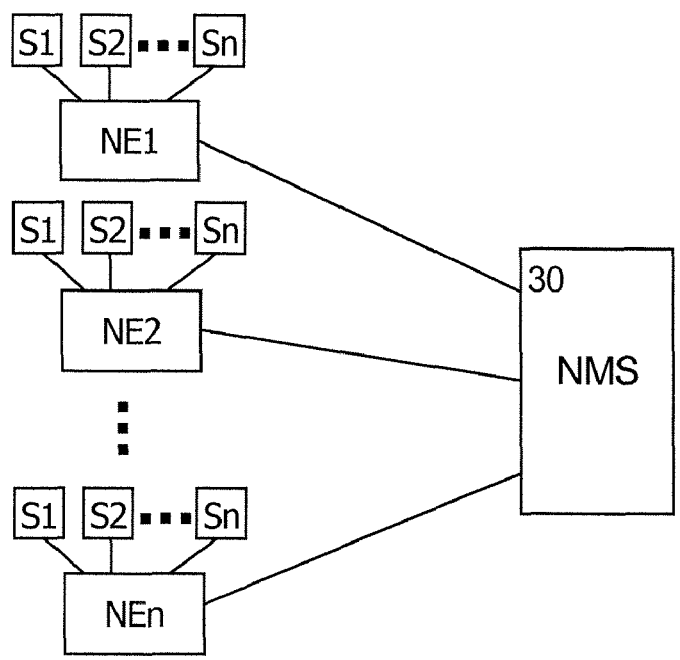
FIG. 1 shows a schematic architecture of a managed network according to an exemplary embodiment.

FIG. 1 shows a schematic architecture of a managed network according to an exemplary embodiment.

In FIG. 1, a plurality of network elements NE1 to NEn are connected to a network management device or system 30 for reporting alarms when abnormalities, failures of fault conditions have been detected. The network management system 30 may as well represent an alarm viewing device such as a local terminal. Each of the network elements NE1 to NEn may as well represent a central element manager, or a mediation device, with one or more network elements connected to (not shown in figure).

According to 3GPP TS 32.111-2, Integration Reference Points (IRPs) are means within the telecommunication management for specifying interoperable points of information exchange between systems and applications. Similarly, an IRP manager may be provided at the network management system 30 and may correspond to a process that interacts with an IRP agent process which may be provided at each of the network elements NE1 to NEn for the purpose of receiving alarms via respective IRPs.

Each IRP agent maintains an alarm list. It contains all currently active alarms i.e., alarms that are not yet cleared. When an alarm is cleared, its corresponding alarm information is removed from the alarm list.

The IRP agent creates a new alarm information in the alarm list whenever an alarm is emitted internally within the IRP agent, which does not match with any alarm in the alarm list. In this case, after creation of the new alarm information, the IRP agent invokes an alarm notification operation. This alarm notification provides the respective alarm information of a specific network resource identified by a corresponding parameter. Each alarm notification comprises an alarm information reference for unambiguous identification in the alarm list maintained at the respective IRP agent. Additionally, each alarm notification comprises a notification header with dedicated parameter-attributes (e.g., managed object class, managed object instance, notification ID, event time, even type, etc.) and an alarm information body with dedicated parameter-attributes (e.g., probable cause, perceived severity, specific problem, correlated notifications, trend indication, threshold information, etc.). Further details concerning these parameter-attributes can be derived from the 3GPP specification TS 32.111-2.

According to an exemplary embodiment, an additional information about the priority for fault correction at the respective network element is added to the alarm notification, e.g., to the alarm notification body. This information may indicate a priority for correction of faults, such as traffic lost, location, etc. at/in the concerned network element. Information to be attached to or added into the alarm notification is planned together with the alarm itself and tailored into the network structure to guarantee right kind of connection between the immediate reason for the alarm and possible priority for fault correction. As a simplified example of such tailoring, a network element on the Wall Street may be more critical than a network element located in some other place although the amount of traffic via the network element may be lower there. Further example, the network element on the Wall Street may be less critical on weekends than weekdays. The higher level monitoring system at the IRP manager of the network management system 30 can then visualize received alarm notifications according to their priority.

The additional information can be determined at the network element and/or derived from external measurement devices or sensors S1 to Sn provided on the network element site, i.e., at each or some of the network elements NE1 to NEn, and used for signalling a fault correction priority determined based on at least two priority indicators selected from the location of the respective network element, the traffic at the respective network element, and optionally environmental conditions. The sensors S1 to Sn may be devices for like temperature meters, humidity meters, RF noise meters, water level meters, etc.

Figure 2:
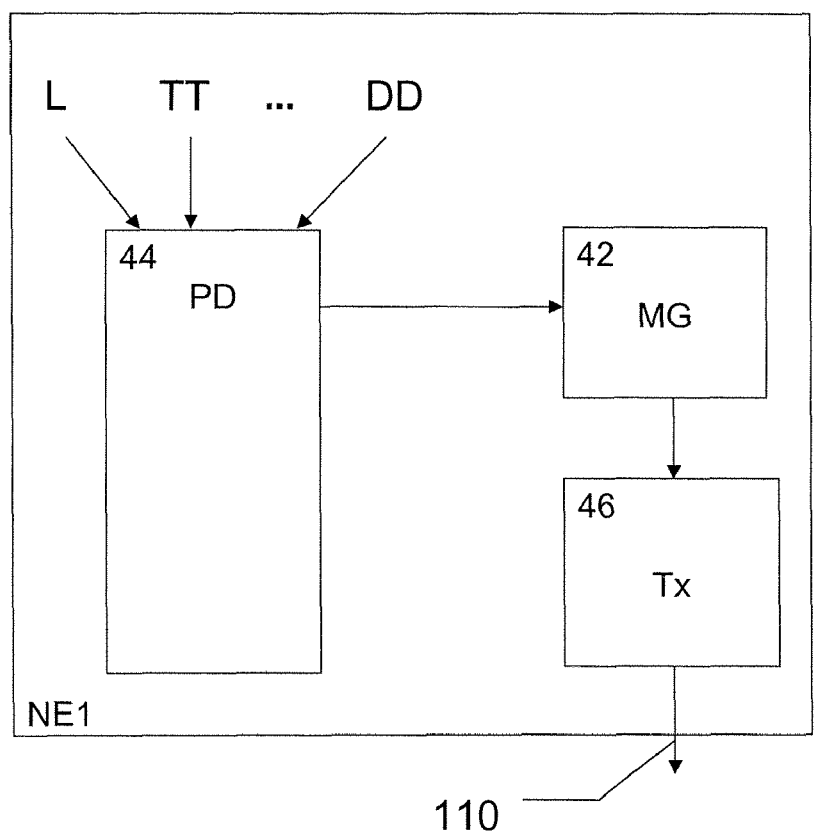
FIG. 2 shows a schematic block diagram of a network element according to an exemplary embodiment.

FIG. 2 shows a schematic block diagram of the network element NE1 according to an exemplary embodiment. It is however noted that the other network elements NE2 to NEn may have the same architecture.

According to an exemplary embodiment, a priority attribute or priority parameter is added to the alarm notifications so as to describe a fault correction priority of operator actions to be initiated based on alarm. The priority parameter may be derived from a combination of the known perceived severity parameter (cf. 3GPP 32.111-2 or ITU X.733) with at least on of a site (physical) location value and other indicators that describe the traffic throughput prior to the fault (amount of lost traffic, transactions, registrations, charging events etc.) and other diagnostic type of data. The amount of attributes depends by case. The priority attribute/parameter can be for example a bit string, a number, a character, a word, or any combination and plurality of those.

The attribute values can be generated at the site, i.e., respective one of the network elements NE1 to NEn of FIG. 1, and indicated to the user via the network management system 30 at different network levels (e.g., BTS (base transceiver station), BSC (base station controller) and so on in case of a cellular network). The site location part can be configurable (determined e.g., on the basis of criticality of the NE instance), the severity can be static like in current solutions, and the traffic throughput indicator can be made lighter than in current measurement applications. In particular, the traffic throughput may indicate how much traffic has been transported prior to a detected fault or how much traffic is lost. This can be determined e.g., by comparing the traffic prior to and during the detected fault.

Parameter values for site location L, traffic throughput TT and other diagnostic data DD (in FIG. 2) may be derived from respective measurement devices or functions (not shown) and are input to an priority determination unit or function 44 in which at least one of the received parameter values is combined with the perceived severity parameter to determine a fault correction priority. If an alarm condition is met, a message generation unit or function 42 is activated, e.g., by the priority determination function 44, to generate an alarm notification 110 and to add the determined fault correction priority. This alarm notification 110 is then supplied to a transmission unit or function 46 which transmits the alarm notification 110 to the network management system 30.

Figure 3:
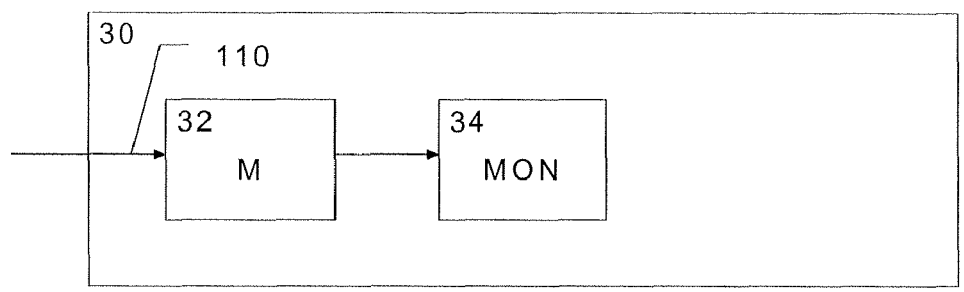
FIG. 3 shows a schematic block diagram of a network management device according to an exemplary embodiment.

FIG. 3 shows a schematic block diagram of the network management system 30 according an exemplary embodiment. Received alarm notifications 110 are stored in a memory unit or function 32 (receiving means not shown in the figure). An alarm monitoring tool 34 visualizes the received and stored alarm notifications 110 in a network management system user interface (not shown in the figure). In some embodiments the alarm monitoring tool may visualize alarms after the network management system has stored them into a database (not shown in the figure). In all cases the alarms can be sorted out on the basis of received fault correction priority.

Thereby, operator's efforts can be focused on critical corrective actions instead of wasting time for scanning huge amounts of alarms, and post-processing analysis of alarms and a received network performance data (which is typically received in a non-real time manner in the network management system).

Figure 4:
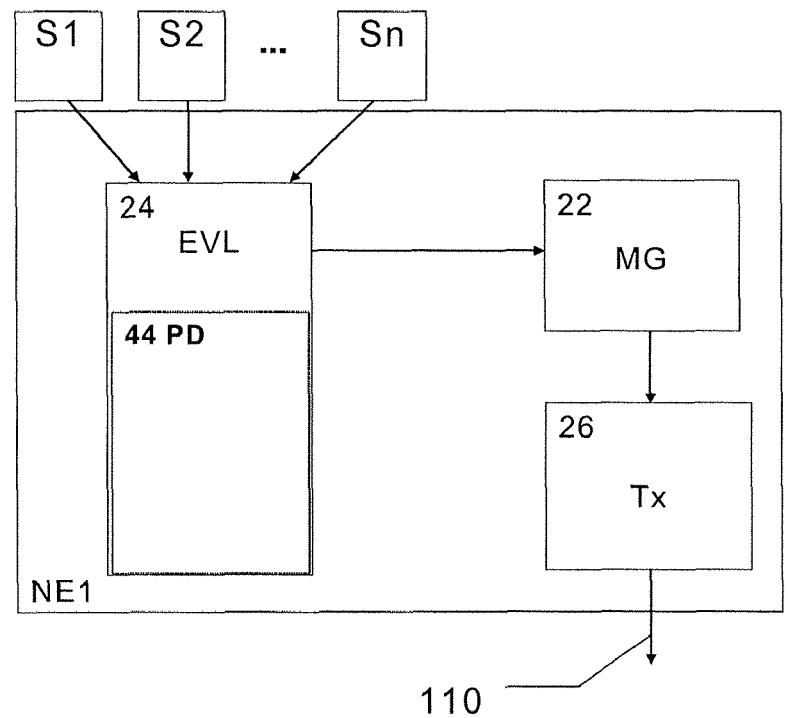
FIG. 4 shows a schematic block diagram of a network element according to an exemplary embodiment.

FIG. 4 shows a schematic block diagram of the network element NE1 according to an exemplary embodiment. It is however noted that the other network elements NE2 to NEn may have the same architecture.

Measurement values obtained from the sensors S1 to Sn are input to an evaluation unit or function 24 in which the received measurement values are evaluated with respect to abnormal conditions or failures, e.g., based on comparisons with predefined threshold values or the like, to determine an alarm condition. The evaluation unit or function 24 may be part of a priority determination unit or function 44, or it can be a separate unit or function. If an alarm condition is met, a message generation unit or function 22 is activated, e.g., by the priority determination function 44 after determining the priority attribute or the priority parameter, to generate an alarm notification 110 and to add the determined fault correction priority. This alarm notification 110 is then supplied to a transmission unit or function 26 which transmits the alarm notification 110 to the network management system 30.

Conventionally, diagnostic types of data are combined in service quality management systems or the like, which are part of the network management system. But these are typically post processing solutions. In contrast thereto, the fault correction or alarm priorities according to the first and second embodiments are set before sending the alarm notification to the network management system 30.

Figure 5:
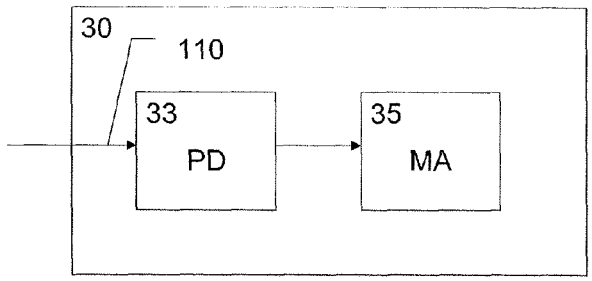
FIG. 5 shows a schematic block diagram of a network management device according to an exemplary embodiment.
Figure 6:
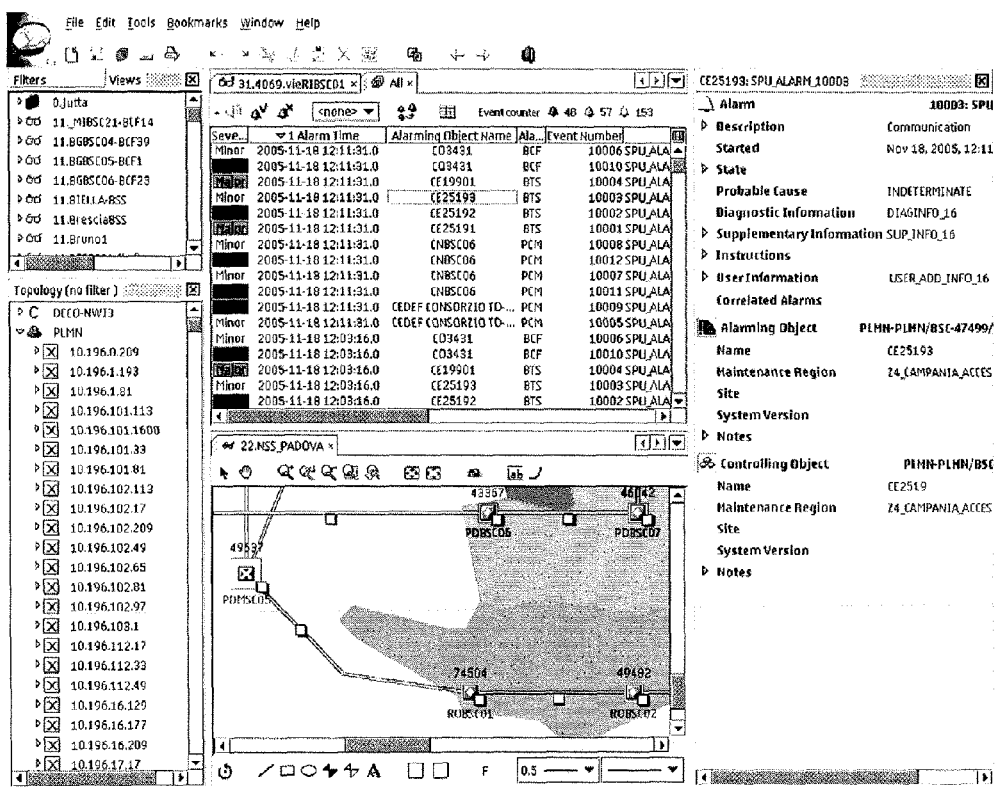
FIG. 6 shows a conventional alarm monitoring tool.

FIG. 5 shows a schematic block diagram of the network management system 30 according an exemplary embodiment. Received alarm notifications 110 are forwarded to and processed or correlated in a priority detection unit or function 33 where the received alarm including the received priority parameter may be visualized e.g., in an alarm monitoring tool and optionally evaluated further. Based on the result of evaluation, a management activity control unit or function 35 determines the priority or schedule of management activities required for the concerned cause of failure or abnormality.

Hence, monitoring persons or functions are provided with better information to support decision making processes, e.g., initiate repair actions at the concerned site, or reset the site or cells in it.

More information is thus integrated into a single alarm notification when the fault is, detected. Additionally, the fault correction priority is embedded into the alarm notification already at the source of the alarm data.

It is noted that the processing blocks indicated in FIGS. 2 to 5 may be implemented as concrete hardware circuits or processing blocks, or alternatively as software routines configured to control a computer device or processor device to generate the above described functionalities.

In summary, a method, system, network element and network management device for announcing a fault condition or failure in a network system have been described. Announcement notifications are prioritized based on a fault correction priority information derived from at least two local parameters determined at a respective network element. Thereby, fault correction activities can be optimized and scheduled.

It is noted that the invention is not restricted to the above embodiments but can be implemented in any announcement system, where announcement notifications are sent from network elements to a network management or monitoring system or device. The preferred embodiment may thus vary within the scope of the attached claims.

The invention claimed is:

1. A method comprising:
   defining at least two priority indicators for a fault correction;
   determining at a network element of a communication network management system a fault correction priority based on said at least two priority indicators, in response to a detection of said fault condition or failure at said network element; and
   determining, at said network element, to transmit an announcement notification to a network management function, said announcement notification indicating said detected fault condition or failure and comprising an information about said determined fault correction priority.

2. A method according to claim 1, wherein said at least two priority indicators are selected from a perceived severity of said detected fault condition or failure, a criticality of said network element, a performance of said network element, and at least one predetermined environmental condition.

3. A method according to claim 2, wherein said at least one predetermined environmental condition is derived from a detection of at least one of a temperature, humidity, radio frequency noise level, or water level.

4. A method according to claim 2, wherein said severity is determined in accordance with a predetermined standard.

5. A method according to claim 2, wherein said criticality of said network element is determined in dependence on at least one of a location, role and compensation option of said network element.

6. A method according to claim 2, wherein said performance of said network element is determined by comparing traffic load prior to and during said detected fault condition or failure.

7. A method according to claim 1, wherein said announcement notification is an alarm notification.

8. A system comprising:
   a determination unit configured to,
      determine, at a network element of a communication network management system, a fault correction priority based on at least two priority indicators, in response to a detection of a fault condition or failure at said network element, and
      determine, at said network element, to transmit an announcement notification to a network management function, said announcement notification indicating said detected fault condition or failure and comprising an information about said determined fault correction priority; and
   a management activity control unit configured to prioritize management actions of said network management function based on said information about said determined fault correction priority.

9. A system according to claim 8, wherein said determination unit is further configured to determine as said priority indicators a perceived severity of said detected fault condition or failure, a criticality of said network element, a performance of said network element, and at least one predetermined environmental condition.

10. A system according to claim 9, wherein said at least one predetermined environmental condition is derived from a detection of at least one of a temperature, humidity, radio frequency noise level, and water level.

11. A system according to claim 9, wherein said severity is determined in accordance with a predetermined standard.

12. A system according to claim 9, wherein said criticality of said network element is determined in dependence on at least one of a location, role and compensation option of said network element.

13. A system according to claim 9, wherein said performance of said network element is determined by comparing traffic load prior to and during said detected fault condition or failure.

14. A system according to claim 9, wherein said announcement notification is an alarm notification.

15. A network element of acommuncation network management system comprising:
   a determination unit configured to determine a fault correction priority based on at least two priority indicators, in response to a detection of a fault condition or failure at a network element; and
   a message generation unit configured to add an information about said determined fault correction priority to an announcement notification,
   wherein said determination unit is further configured to determine to transmit said announcement notification to a network management function.

16. A network element according to claim 15, wherein said determination unit is further configured to determine as said priority indicators a perceived severity of said detected fault condition or failure, a criticality of said network element, a performance of said network element, and at least one predetermined environmental condition.

17. A network element according to claim 16, wherein said at least one predetermined environmental condition is derived from a detection of at least one of a temperature, humidity, radio frequency noise level, and water level.

18. A network element according to claim 16, wherein said severity is determined in accordance with a predetermined standard.

19. A network element according to claim 16, wherein said criticality of said network element is determined in dependence on at least one of a location, role and compensation option of said network element.

20. A network element according to claim 16, wherein said performance of said network element is determined by comparing traffic load prior to and during said detected fault condition or failure.

21. A network element according to claim 15, wherein said announcement notification is an alarm notification.

22. A non-transitory computer readable storage medium comprising computer program code, said computer readable storage medium and said computer program code configured to, with one or more processors, cause an apparatus to at least perform the method of claim 1.

* * * * *